Jan. 19, 1932.  F. E. DAVIS  1,842,075
BRAKE TORQUE TRANSMITTING MECHANISM
Filed March 14, 1930   2 Sheets-Sheet 1
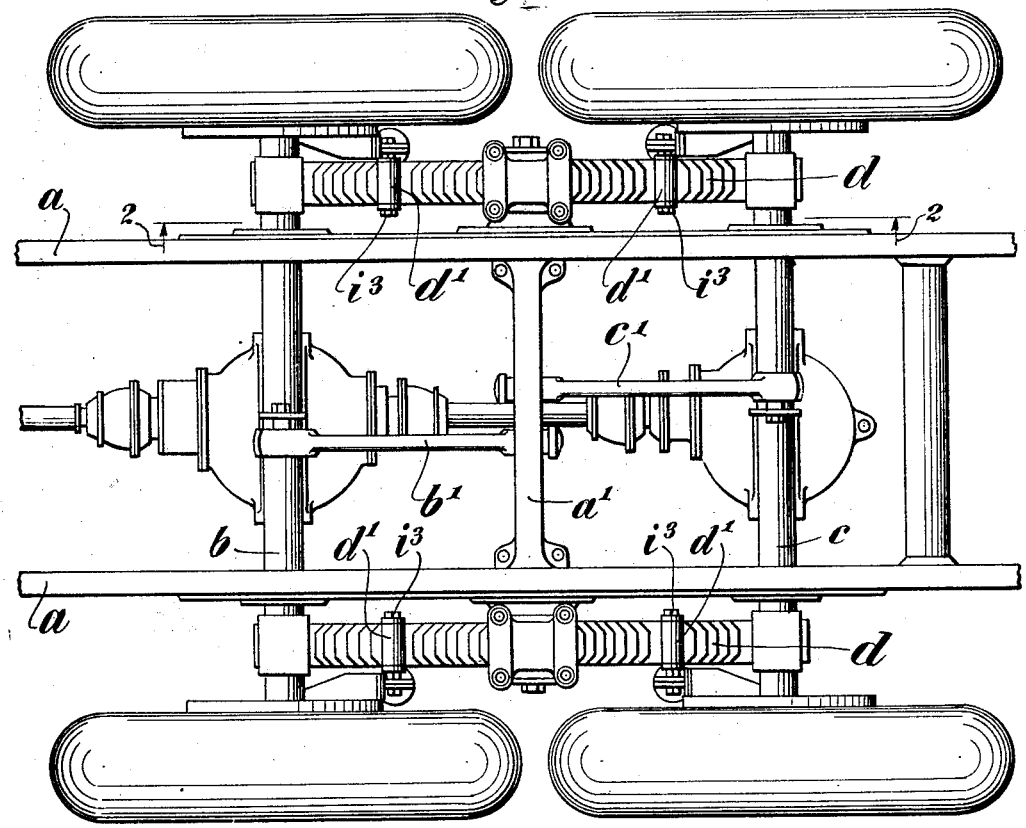
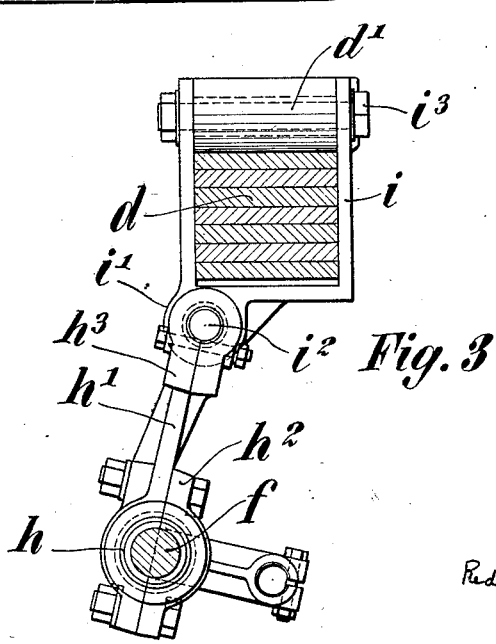
INVENTOR
Floyd E. Davis,
BY
Redding, Greeley, O'Shea Campbell
HIS ATTORNEYS Jan. 19, 1932.  F. E. DAVIS  1,842,075
BRAKE TORQUE TRANSMITTING MECHANISM
Filed March 14, 1930  2 Sheets-Sheet 2
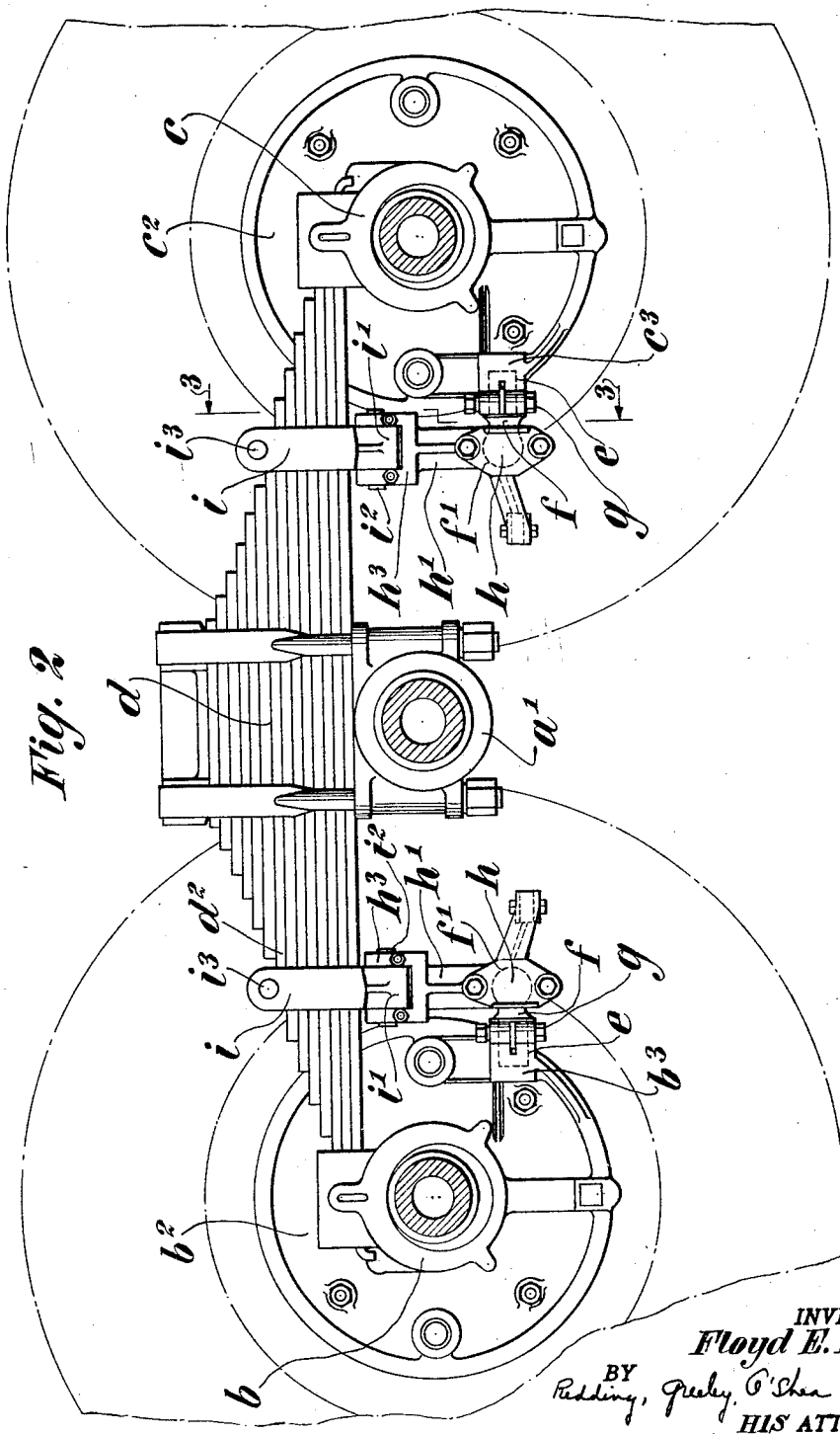
INVENTOR
Floyd E. Davis,
BY Redding, Greeley, O'Shea + Campbell
HIS ATTORNEYS Patented Jan. 19, 1932

1,842,075

UNITED STATES PATENT OFFICE

FLOYD E. DAVIS, OF ALLENTOWN, PENNSYLVANIA, ASSIGNOR TO INTERNATIONAL MOTOR COMPANY, OF NEW YORK, N. Y., A CORPORATION OF DELAWARE

BRAKE TORQUE TRANSMITTING MECHANISM

Application filed March 14, 1930. Serial No. 435,767.

The present invention relates to torque transmitting devices and embodies, more specifically, an improved torque transmitting mechanism for transmitting the braking torque of motor vehicles to the frames thereof.

In existing vehicle constructions, the braking torque, as well as the driving torque, is transmitted to the frames thereof through the axles, thus imposing a considerable strain upon the axle and requiring relatively heavy parts. The present invention proposes to provide a construction in which the braking torque is isolated from the driving torque and transmitted to the frame through mechanism which is independent of the vehicle driving mechanism. In so doing, the torque members in the center of the axle of a vehicle are not required to do any more work than that of taking the driving torque and keeping the axles in their proper positions. Since the axles are relieved from a very considerable strain, they may be made lighter and thus function more effectively than existing designs.

An object of the invention is to provide a torque transmitting device for isolating the braking torque of a motor vehicle and applying it to the frame through mechanism which is independent of the driving mechanism.

A further object of the invention is to provide a device for applying the braking torque of a motor vehicle directly to the frame through a mechanism which is simple in construction and readily applied and dismounted from the vehicle, the parts thereof being easily accessible for inspection.

Further objects, not specifically enumerated above, will be apparent as the invention is described in greater detail in connection with the accompanying drawings, wherein:

Figure 1 is a plan view showing a portion of a vehicle chassis provided with braking torque transmitting devices constructed in accordance with the present invention.

Figure 2 is a view in section, taken on line 2—2 of Figure 1, and looking in the direction of the arrows.

Figure 3 is a view in section, taken on line 3—3 of Figure 2, and looking in the direction of the arrows.

Referring to the above drawings, $a$ designates the side frame members of a motor vehicle having a transverse bracing member $a'$. Forward and rear driving axles $b$ and $c$, respectively, are mounted upon the frame through springs $d$, this mounting being of conventional construction and forming no part of the present invention. The driving torque is transmitted from these axles to the frame by means of torque rods $b'$ and $c'$, respectively, in a well known fashion.

Referring particularly to Figures 2, and 3, the forward and rear axles $b$ and $c$ carry the usual brake spiders $b^2$ and $c^2$, respectively, upon which brackets $b^3$, and $c^3$, respectively, are formed. These brackets are formed with suitable recesses $e$ within which pins $f$ may be secured by means of bolts $g$. The pins $f$ are formed with ball heads $f'$ which are received within sockets $h$ carried upon link members $h'$. The sockets are preferably formed with a split removable cover portion $h^2$ to facilitate assembling the elements.

The upper ends of link members $h$ are provided with bifurcated portions $h^3$ which are pivotally secured to U-shaped spring clips $i$, the lower extremities of which are formed with pivot supports $i'$ within which pivot pins $i^2$ are received.

The U-shaped spring clips $i$ are journaled within the turned over extremities $d'$ of one of the leaves $d^2$ of the spring $d$. Bolts $i^3$ serve as a means for journalling the spring clips $i$ within the portions $d'$ and it will thus be seen that the braking torque which normally tends to cause the brake spiders $b^2$ and $c^2$, respectively to rotate about their respective axles is transmitted through the pins $f$ and link members $h'$ to the U-shaped clips $i$ and spring $d$. The pivotal mounting of spring clips $i$ permits a degree of turning of the spiders with respect to the spring when irregularities in the road surfaces are negotiated by the vehicle. Upon application of the brakes, the braking force is thus transmitted directly to the spring through the connections defined above without being taken by the respective axles, thus relieving such axles from the very considerable stresses incident to the braking of the vehicle.

While the invention has been described with specific reference to the accompanying drawings, it is not to be limited, save as defined in the appended claims.

I claim as my invention:

1. A device of the character described comprising a vehicle frame, a driving wheel carrying a brake spider, a spring mounting the wheel upon the frame, a pin secured to the spider and formed with a ball head, a link formed with a socket to engage the head, a turned over portion on one of the leaves of the spring, a clip journaled in the turned over portion to swing in the plane thereof, and a pin carried by the clip in the plane of the spring to mount the link pivotally.

2. A device of the character described comprising a vehicle frame, a driving wheel carrying a brake spider, a spring mounting the wheel upon the frame, a pin secured to the spider and formed with a ball head, a link formed with a socket to engage the head, a clip journaled on the spring to swing in the plane thereof, and a pin carried by the clip in the plane of the spring to mount the link pivotally.

3. A device of the character described comprising a vehicle frame, a driving wheel carrying a brake spider, a spring mounting the wheel upon the frame, a link pivoted on the spider through a ball and socket joint, a spring clip journaled on the spring, and means to pivot the link on the clip.

4. A device of the character described comprising a vehicle frame, a driving wheel carrying a brake spider, a spring mounting the wheel upon the frame, a link pivoted on the spider, and means to journal the link on the spring.

5. A device of the character described comprising a vehicle frame, a driving wheel carrying a brake, a spring mounting the wheel upon the frame, means to transmit driving forces to the frame, a link connected to the brake, and means to journal the link on the spring.

6. A device of the character described comprising a vehicle frame, a driving wheel carrying a brake, a spring mounting the wheel upon the frame, means to transmit driving forces to the frame, and separate means to transmit braking forces to the spring.

This specification signed this 3rd day of March, A. D. 1930.

FLOYD E. DAVIS.